Aug. 27, 1963 — E. A. SCHULZ — 3,101,575
AUTOMATIC LAP SENSING AND CORRECTING DEVICE
Filed March 6, 1961 — 6 Sheets-Sheet 1

INVENTOR.
Eugene A. Schulz

Aug. 27, 1963     E. A. SCHULZ     3,101,575
AUTOMATIC LAP SENSING AND CORRECTING DEVICE
Filed March 6, 1961     6 Sheets-Sheet 2

INVENTOR:
Eugene A. Schulz
BY Charles J. Vojtech
Att'y

INVENTOR.
Eugene A. Schulz

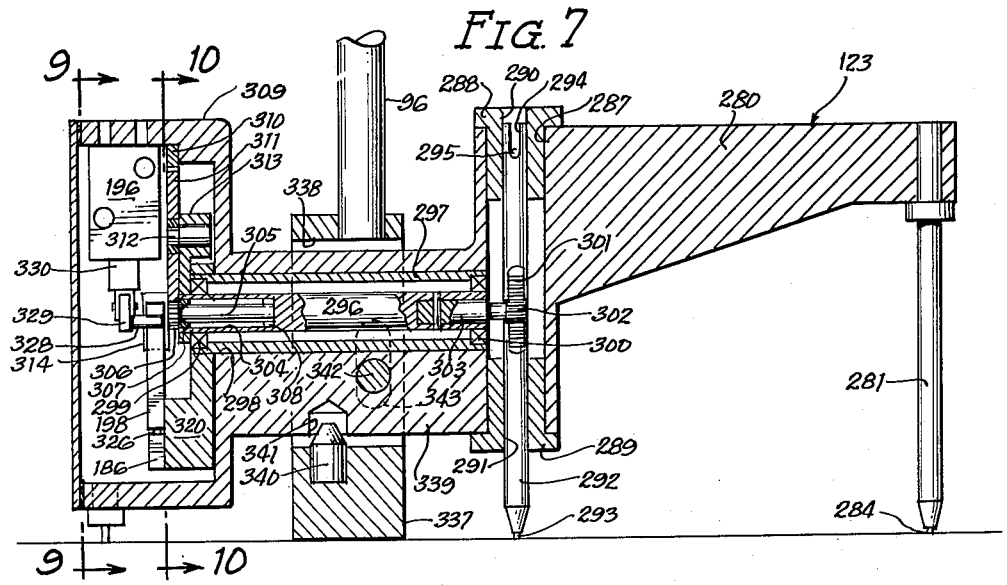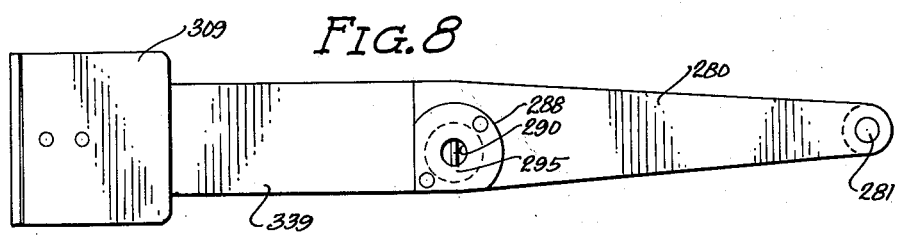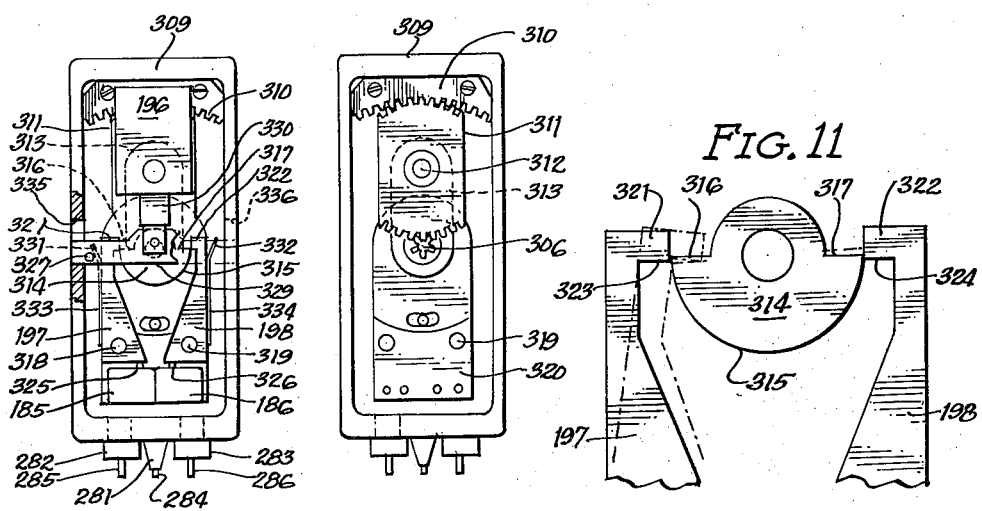

Aug. 27, 1963  E. A. SCHULZ  3,101,575
AUTOMATIC LAP SENSING AND CORRECTING DEVICE
Filed March 6, 1961  6 Sheets-Sheet 5
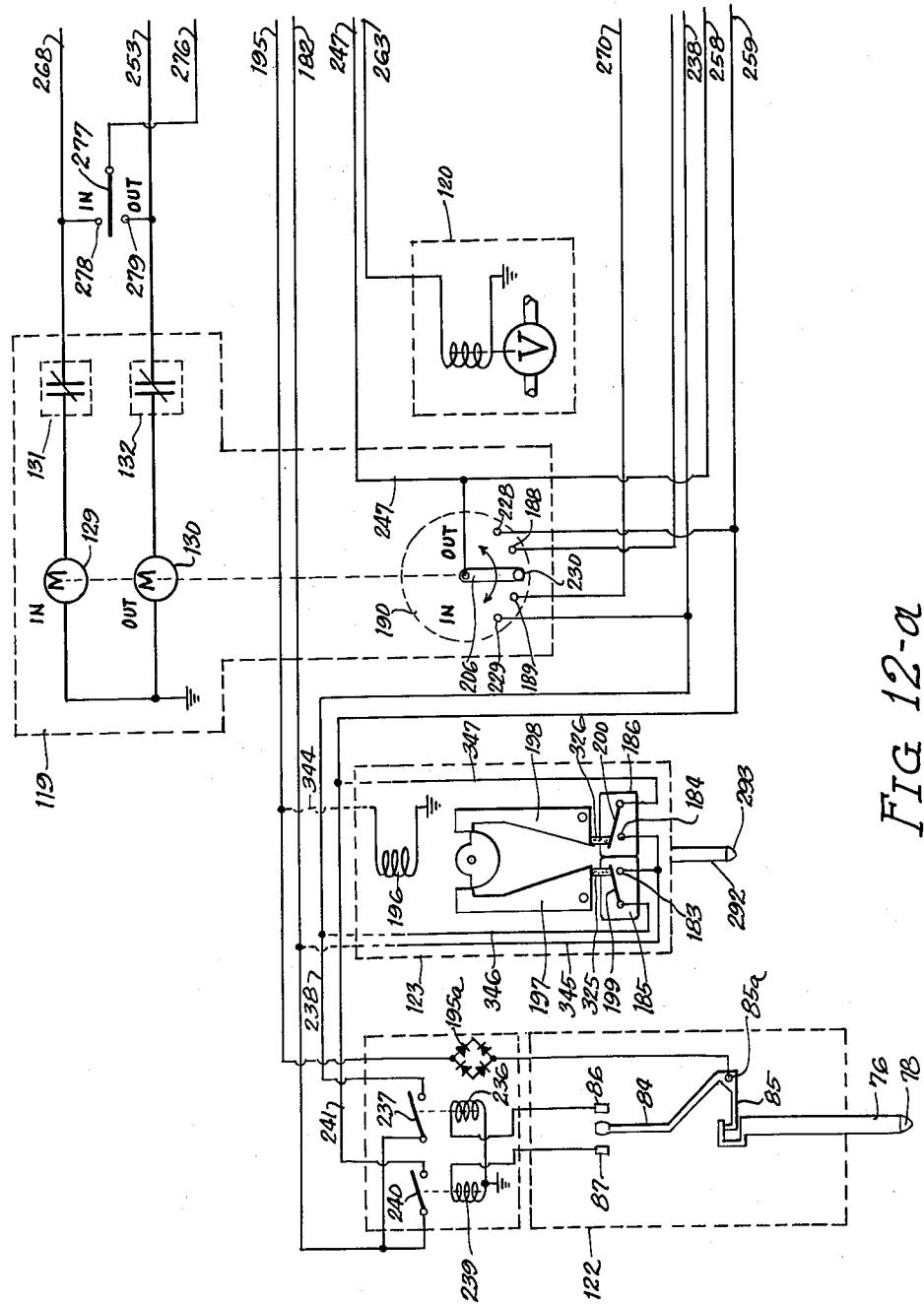
FIG 12-a
INVENTOR.
Eugene A. Schulz
BY
Charles J. Vajtech
Atty

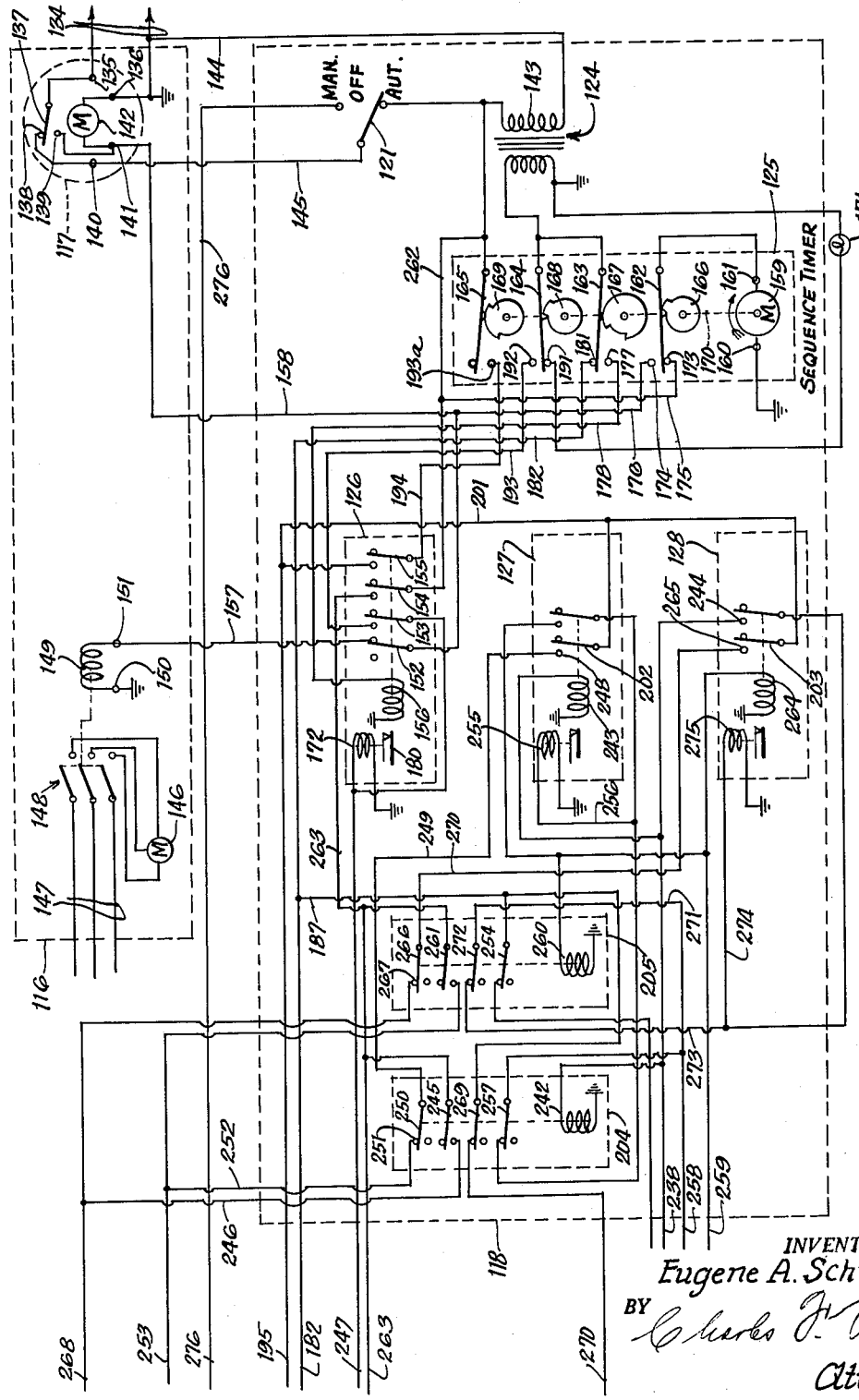
FIG. 12-b

United States Patent Office 3,101,575
Patented Aug. 27, 1963

3,101,575
AUTOMATIC LAP SENSING AND CORRECTING
DEVICE
Eugene A. Schulz, Arlington Heights, Ill., assignor to
Crane Packing Company, Morton Grove, Ill., a corporation of Illinois
Filed Mar. 6, 1961, Ser. No. 93,625
21 Claims. (Cl. 51—129)

This invention relates to lapping machines having rotatable lap plates and particularly to apparatus for automatically producing and maintaining a predetermined contour on the operative surface of such lap plates.

There have been proposed an apparatus and a method for automatically sensing deviations of a rotatable lap surface from a predetermined contour and then operating upon a correcting tool which functions simultaneously with the lapping operation to cause said tool to eliminate such deviations. Such apparatus also is provided with means for effecting changes in a lap contour to a selected new contour. In sensing the condition of a lap contour, however, the proposed apparatus uses as a reference point or line an element secured to the frame of the machine, and hence is dependent upon the trueness of rotation of the lap plate relative to the frame for its accuracy. It has been found that a lap plate, though having a satisfactory true surface, may not have such surface disposed at right angles with its drive shaft, and hence may describe a wobble as it rotates past a fixed point on the frame. Such wobble gives a false reading of the sensing device and an unwanted operation of the correcting means.

It is an object of this invention to provide a sensing device for sensing the condition of a rotatable lap plate surface, said device being independent of lap plate wobble for its accuracy.

In one commercially available form to which this invention is particularly adaptable, the lapping machine has a rotatable annular lap on which are mounted rotatable correcting tools in the form of wear rings for conditioning the lap. The rings overhang the inner and outer peripheries of the annular lap plate and can effect a change in lap surface contour in accordance with the degree of overhang. Thus, if the rings overhang the outer periphery more than the inner periphery, the lap will be worn more on its outer regions, and the lap will be worn more on its inner regions if the rings are shifted radially to overhang the inner periphery more than the outer periphery.

Another object of this invention is to provide positioning devices for correcting tools for the annular lap plate surface of a lapping machine of the above type, whereby all of said devices may be altered simultaneously, thereby reducing the time required to effect such adjustment and ensuring uniformity of adjustment as between all correcting tools.

Another object of this invention is the provision of a lap surface contour sensing device which is independent of surface wobble, in combination with simultaneously operated correcting tool positioning devices, with means controlled by the sensing device for effecting such simultaneous operation of the positioning devices.

As a more specific object, this invention has within its purview the provision of a plurality of yoke members for holding rotating wear or correcting devices on a lap surface against revolution with the lap, each of said yoke members having a part thereof adjustable for effecting a change in the radial position of the correcting devices, and motor driven means connected to each of said adjustable parts for simultaneously effecting a change in the radial position of all of the correcting devices.

Another specific object of this invention is the provision of a lap surface contour sensing device and mounting therefor wherein said device is comprised of three fixed supports, one of which is widely spaced from the other two and a movable probe disposed substantially mid-way between the said one fixed support and the other two supports, said mounting permitting the device to have a universal movement to allow all of the fixed supports to contact the lap surface, thereby to render the device independent of lap surface wobble.

Another object of this invention is to provide a control circuit for the position adjusting motor means for the conditioning rings of a lapping machine, which circuit will automatically cause said rings to be moved radially a predetermined distance in accordance with a signal produced by a sensing device contacting the lap surface of the machine, and which will prevent over-correction by moving said rings back when the lap surface achieves its desired contour.

A more specific object of this invention is to provide a control circuit for the position adjusting motor means for the conditioning rings of a lapping machine, and for the motor which drives the lap plate of the lapping machine, wherein the position adjusting motor means is rendered inoperative while the lapping machine motor is in operation, to prevent damage to the lap surface sensing device by contact with a moving lap surface.

A still further specific object of this invention is the provision of a control circuit for a lapping machine and for the positioning means for the conditioning rings thereof which will (1) prevent operation of the positioning means while the lapping machine is in operation; (2) automatically energize the circuit for the positioning means upon the termination of the lapping operation; (3) lower the lap surface condition sensing mechanism upon the lap surface, operate the positioning means in accordance with the signal produced by the sensing mechanism; (4) raise the lap surface condition sensing mechanism from the lap surface; and (5) de-energize the positioning means circuit and make possible the re-energization of the lapping machine.

A further specific object of this invention is the provision of a control circuit for the motor of an adjusting mechanism for a lap surface contour correcting device which is adaptable for use with any one of a number of different lap surface contour sensing devices.

These and other objects of this invention will become apparent from the following detailed description of an illustrative embodiment thereof when taken together with the accompanying drawings in which:

FIG. 7 is a side elevational view, partly in section, of a modification of the sensing mechanism;

FIG. 8 is a plan view of the sensing mechanism of FIG. 7;

FIG. 9 is an end elevational view in section of the sensing mechanism of FIG. 7, the section being taken along the line 9—9 thereof and looking in the direction of the arrows;

FIG. 10 is a further end elevational view of the sensing mechanism of FIG. 7, the section being taken along the line 10—10 thereof and looking in the direction of the arrows;

FIG. 11 is an enlarged fragmentary end elevation of a portion of the mechanism shown in FIG. 9;

FIG. 12a is a portion of the schematic wiring diagram for the electrical components of the sensing mechanism and of the associated lapping machine driving mechanism and conditioning ring shifting mechanism; and FIG. 12b is the remaining portion of the said schematic wiring diagram.

In the embodiment of this invention chosen to illustrate this invention, the operation of the lapping machine on which the sensing mechanism is installed is controlled by a timer switch which is manually turned on and automatically turned off in accordance with the length of time set for a lapping cycle. The lap plate has radial serrations in the operative surface thereof to assist in the elimination of spent grit and removed stock. If the sensing device were to be in contact with the serrated lap surface while the latter is rotating, the lap contacting mechanism of the sensing device might be damaged, and hence, in the present embodiment, an electrical interlock is provided between the timer switch and the electrical control for the lowering mechanism for the sensing device which prevents operation of the lowering mechanism while the lap plate is rotating.

The desired cycle of operation of the illustrative embodiment is as follows:

The lapping machine is loaded with the parts to be lapped by placing the parts within the wear rings of the machine and the machine is then set in operation by its timer switch. The parts are lapped, and while they are being lapped, the interlock between the lowering mechanism and lapping machine drive motor controls prevents the lowering mechanism from operating. When the lapping cycle is completed, the machine will stop and a sequence switch in the control circuit is set into operation. This sequence switch first deenergizes the timer circuit to prevent operation of the lapping machine motor and then initiates the lowering of the sensing head upon the lap. The sensing head then produces a signal in accordance with the condition of the lap surface and if a correction is indicated, directs a motor which controls the positioning of the correcting devices to rotate and thus to move the correcting devices. The direction of rotation of the motor depends upon the nature of the signal produced by the sensing head. The correcting devices will be moved by predetermined increments, with means for reversing the movement under certain conditions to prevent over-correction. If the lap surface does not deviate sufficiently from the desired contour to produce a signal in the sensing head, the sequence switch deenergizes the sensing head and raises it off the lap, after which it reenergizes the timer switch to make possible the next lapping cycle and leaves the control circuit set for the next sensing operation.

Figure 1:
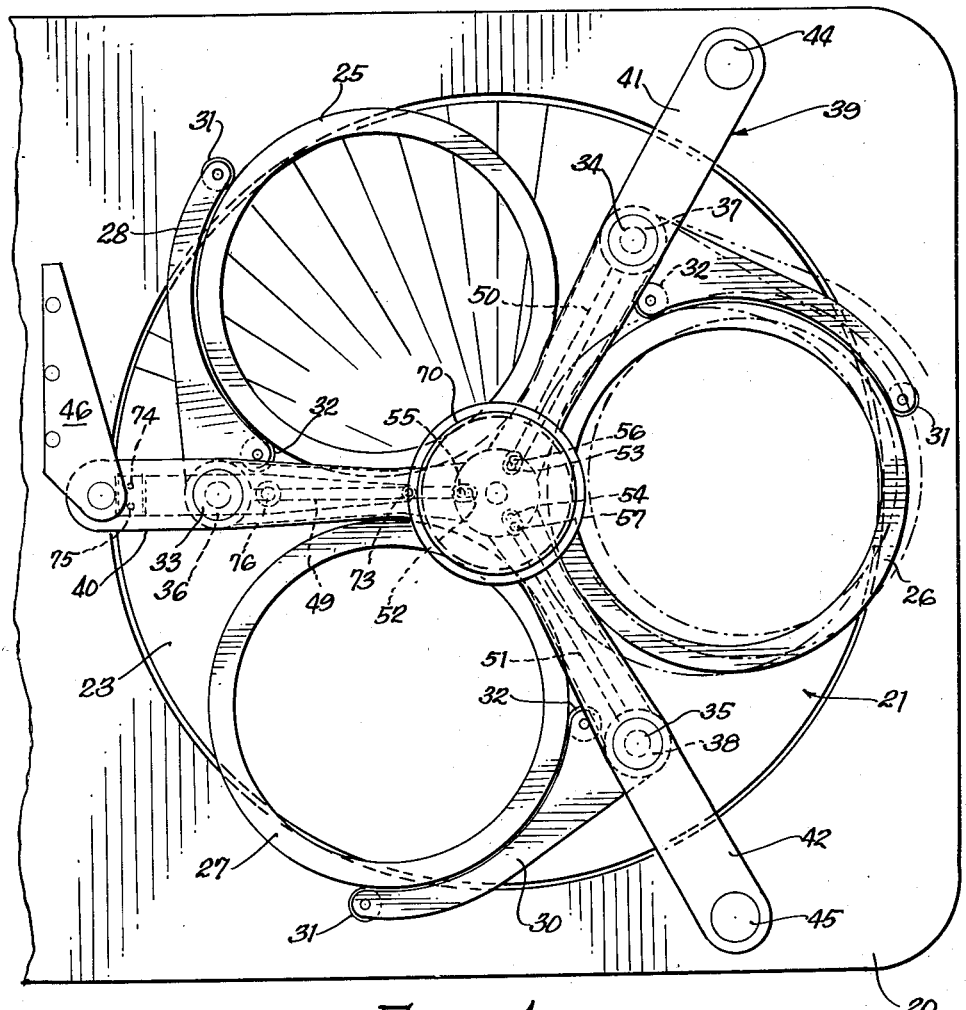
FIGURE 1 is a fragmentary plan view of a lapping machine to which this invention may be applied.

Referring now to the drawings for a detailed description of the invention, a portion of the lapping machine to which this invention may be applied is shown in FIG. 1. It is of the basic type shown in R. D. Roshong Patent No. 2,627,144 and McGee et al. Patent No. 2,821,818. It is comprised of a frame 20 on which is mounted a disc-shaped lap plate 21 (FIGS. 1 and 3) having a central recess 22 to form an annular lap surface 23. Suitable mechanism (not shown) is used to rotate lap plate 21 about a vertical axis, said mechanism including an electric motor, the operation of which is controlled by a starter switch shown schematically at 24 in FIG. 12.

As in the lap surface conditioning methods described in the aforesaid Roshong patent, lap surface 23 is kept free of scratches, and its contour is maintained true, by the use of a plurality of heavy rings 25, 26, 27, which are sometimes hereinafter called "wear" rings or "conditioning" rings. These rings rest loosely on the lap surface 23 and are held against being carried around with the rotating lap surface by a plurality of yokes 28, 29, 30, each of which is provided with spaced rollers 31, 32 against which the rings are adapted to bear. It is contemplated that lap plate 21 rotates in a counterclockwise direction, so that the frictional forces developed between the rings and lap surface 23 will hold said rings against said rollers.

Figure 3:
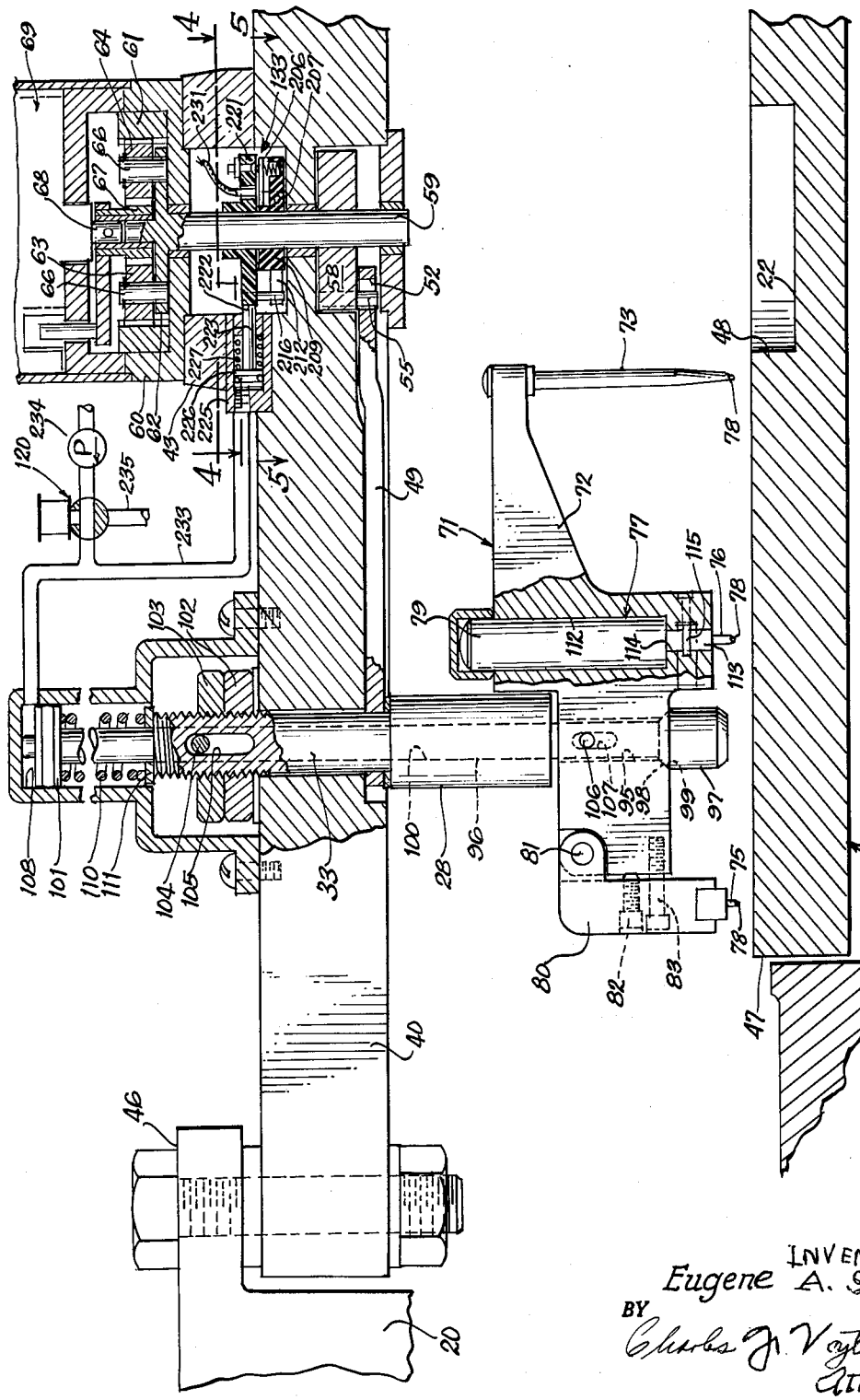
FIG. 3 is an enlarged elevational view, partly in section, of a lap surface contour sensing device and of the drive mechanism for the adjusting mechanism.

Yokes 28, 29 and 30 have upwardly extending pins 33, 34 and 35 received in bearings 36, 37 and 38, respectively, formed in a spider bar 39 having three arms 40, 41 and 42 radiating from a central hub 43. Spider bar 39 is supported above lap surface 23, as shown in FIGS. 1 and 3 by posts 44 and 45, and by a bracket 46, all secured to the frame 20 of the machine.

When rings 25, 26 and 27 are held against revolution with lap surface 23 by their respective yokes 28, 29 and 30, the frictional forces developed between the rotating lap surface 23 and the bottom surfaces of the rings are such as to induce a rotation in the rings about their axis in the same direction (i.e., counterclockwise as viewed in FIG. 1) and at approximately the same speed as the lap surface 23. The rings are of an outside diameter which is greater than the radial dimension of lap surface 23 so that the rings may overhang both the inner and outer peripheries of the lap surfaces 23. Thus, as the rings rotate about their own axes, they sweep over the lap surface and dress it to remove grooves and scratches therefrom. The contour of the lap surface 23 may also be controlled by rings 25, 26 and 27 by regulating the relative amount of overhang of the rings with respect to the inner and outer peripheries of the lap surface 23. Thus, if the rings overhang the outer periphery 47 of lap surface 23 more than its inner periphery 48, the rings will wear the outer regions of the lap surface more than its inner regions and thereby produce a convex lap. A concave lap is produced by causing the rings to overhang the inner periphery of the lap surface more than the outer periphery, and a flat lap is produced by selecting an appropriate position between the convex- and concave-producing positions.

Shifting of the rings 25, 26 and 27 radially of the lap surface 23 is effected by rotating yokes 28, 29 and 30 about their pins 33, 34 and 35, respectively. In the present invention, it is contemplated that all three yokes will be rotated simultaneously and to this end, the yokes are in fact the first arms of bell cranks pivoted on pins 33, 34 and 35 and formed with second arms 49, 50 and 51 extending radially inwardly under the spider arms 40, 41 and 42, respectively. Each said second arm terminates in a slot (FIGS. 1 and 3) 52, 53 and 54, respectively, under the spider bar hub 43 in each of which is received a pin 55, 56 and 57 depending from a disc 58. Said disc 58 is, in turn, secured to a shaft 59, for rotation therewith, said shaft extending upwardly into a gear housing 60 fixed to hub 43.

Figure 2:
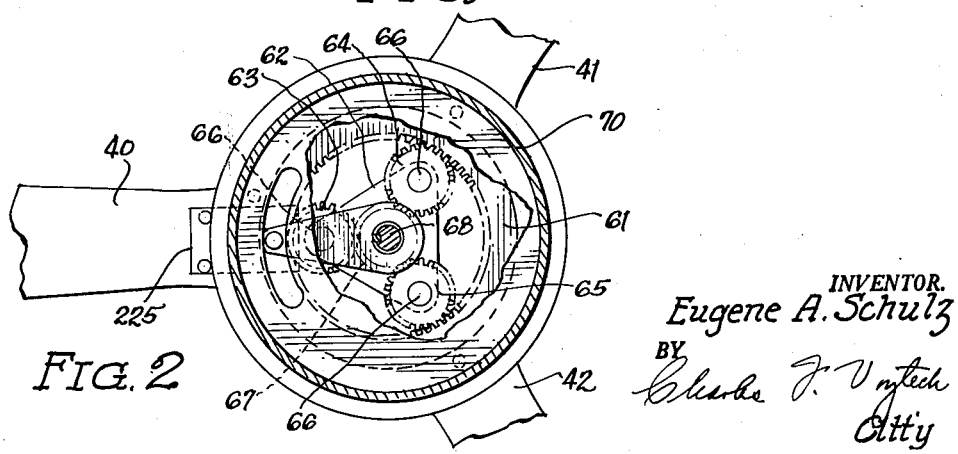
FIG. 2 is an enlarged fragmentary plan view of the drive mechanism for the position adjusting mechanism for the wear rings of the machine.

Within gear housing 60 are a fixed ring gear 61, a planet gear carrier 62 fixed to shaft 59, planet gears 63, 64 and 65 (FIG. 2) mounted for rotation on pins 66 and meshing with ring gear 61, and a central sun gear 67 meshing with planet gears 63, 64 and 65. Sun gear 67 is piloted on shaft 59 and is secured to the downwardly extending shaft 68 of a motor 69, the housing 70 of which is fixed to transmission housing 60. Rotation of sun gear 67 by motor 69 results in a rotation of carrier 62 in the same direction as the motor, but at a reduced speed and at a corresponding increase in torque. The rotation of carrier 62 causes a rotation of disc 58, and the pins 55, 56, 57 will then rotate arms 49, 50 and 51 and the yokes 28, 29 and 30 about pins 33, 34 and 35, thus effecting a radial shift of said yokes with reference to lap surface 23. The direction of the shift depends upon the direction of rotation of motor 69, the latter being in fact two separate motors on a common shaft, one motor being designed to rotate oppositely to the other to provide a shift in whatever direction is required. The operation of motor 69 is controlled in a manner to be hereinafter described.

The need, or lack of need, of a radial shift in the wear rings 25, 26 and 27 is determined by a sensing device which is patterned after the well-known spherometer. Two forms of sensing devices are disclosed herein, the first being shown in FIGS. 3 and 6 and utilizing a readily available displacement indicating device, and the second being shown in FIGS. 7 to 11, inclusive, and utilizing a special displacement indicating device.

Figure 6:
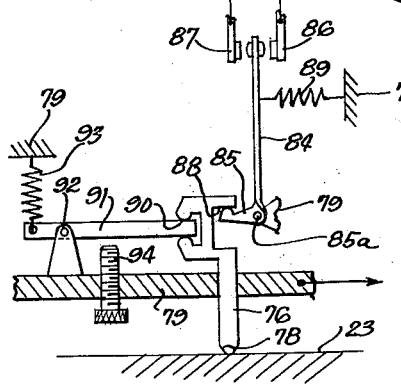
FIG. 6 is a diagrammatic representation of the lap surface contacting portion of the form of sensing mechanism shown in FIG. 3.

Referring now to FIGS. 3 and 6, the lap surface contour sensing device there depicted is comprised of a head 71 in the form of a rigid elongated bar 72 having a downwardly extending leg 73 rigidly secured to one end of said bar, and a pair of legs 74 and 75 (FIG. 1) at its other end. The latter two legs are spaced apart to form with leg 73 a triangle to give head 71 a three-point support. The lower extremities of the legs 73, 74 and 75 are provided with hardened metal or jewelled inserts 78 by which said legs are supported on lap surface 23. It is desirable that for uniform results, wear of the lower extremities of the legs 73, 74 and 75 be held to a minimum and consequently materials which resist abrasion by the lap 23 and the lapping compound therein should be used at the ends of said legs.

For a fine vertical adjustment of legs 74 and 75 relative to bar 72, said legs may be mounted in an arm 80 mounted on a horizontal pivot 81 on bar 72. An adjusting screw 82 and a lock screw 83 serve to lock arm 80 in any adjusted position thereof relative to bar 72.

Equidistantly spaced from said legs 73, 74 and 75 is a vertically displaceable probe 76 forming part of a unit designated generally by reference character 77 which, like legs 73, 74 and 75, has a hardened metal or jewelled insert 78 which is adapted to contact lap surface 23. Probe 77 may be a part of a readily available electric comparator sold by the Mahr Gage Company, Inc., of 274 Lafayette Street, New York 12, N.Y. Such comparators generally take the form of a cylindrical housing 79 within which are mounted a single-pole double-throw switch and a motion multiplying lever mechanism for operating the switch. The switch and lever mechanism may take the form shown diagrammatically in FIG. 6. The switch is comprised of a bell crank having a long arm 84, a short arm 85 and a pivot 85a on the cylindrical housing 79. A spring 89 normally biases the lever 84 toward the right as viewed in FIG. 6. A pair of spaced fixed contacts 86, 87 are arranged on either side of the free end of arm 84, said arm 84 being adapted to touch one or the other of said contacts 86, 87 to complete a circuit therethrough. Probe 76 has a notch 88 bearing against short arm 85 and a notch 90 in which is the close-fitting end of a lever 91 pivoted at 92 to a fixed point on housing 79. A spring 93 normally urges lever 91 to rotate in a clockwise direction about pivot 92 against an adjustable stop 94 on housing 79.

It may be apparent from FIG. 6 that springs 93 and 89 oppose one another, and hence spring 93 is made stronger than spring 89 so that lever 91 will normally rest against stop 94, so that all lost motion between the probe 76 and lever 85 will be taken up. Said stop 94 is adjusted so that probe 76, when free, will be in its lowermost position and will hold lever 85 against contact 87. As probe 76 is moved upward, lever 84 breaks contact with contact 87, passes through the neutral stage shown in FIG. 6, and then makes contact with contact 86. The short length of arm 85 relative to arm 84 produces a motion multiplication for the movement of probe 76 and provides great sensitivity to the device. For use as a lap surface contour sensing device, the sensitivity required is in the order of 50 millionths of an inch in 9 inches of length. The controls for motor 69 are thus set so that when probe 76 is in its lowermost position, it will indicate a concave lap and the shaft 59 will be rotated in the direction to move rings 25, 26 and 27 radially outwardly. When probe 76 is in its intermediate or neutral position wherein neither contact 87 nor 86 is contacted by arm 84, indicating a flat lap, shaft 59 will not be rotated (except under certain special circumstances to be hereinafter described), and when probe 76 is in its upper position it will indicate a convex lap and the said shaft will be rotated in a direction to move rings 25, 26 and 27 radially inwardly.

Housing 79 is received in an opening 112 in head 71, said probe housing 79 having a hollow stem 113 extending through a smaller opening 114. Stem 113 may be rigidly held against movement relative to head 71 by any suitable means such as a clamp 115 which may comprise a U-shaped strap passing around said stem and held against head 71 by screws or the like.

The mechanism for raising and lowering head 71 relative to lap surface 23 is shown in FIG. 3. Said head has a vertically disposed opening 95 therein through which passes a rod 96, said rod having a head 97 and a tapered shoulder 98 cooperating with the chamfered end 99 of opening 95 to support and center said head relative to said rod. The rod 96 extends upwardly through an opening 100 in yoke 28 and pin 33 by which rod 96 is guided, and has a piston 101 secured to the upper end thereof. Pin 33 is held against vertical movement in arm 40 by a nut 102 and lock nut 103 threaded on the upper end of pin 33.

Head 71 must be disposed along a radius of lap surface 23 for maximum sensitivity and the rod 96 is therefore held against rotation in pin 33 by a pin 104 extending through rod 96 and into axially disposed slots 105 in rod 96. Head 71 has a pin 106 passing therethrough and through an axially disposed slot 107 in the lower end of rod 96. Although pin 33 and yoke 28 are turned through a small angle when the position of the ring 25 is to be adjusted, the angle is not sufficiently large to affect the sensitivity of the head 71 which turns with yoke 28.

Piston 101 operates in a cylinder 108 which is formed in the upper end of a housing 109 secured to the top of arm 40. A compression spring 110 is inserted between piston 101 and a washer 111 bearing against the upper end of pin 33 and serves to hold rod 96 and head 71 in a raised position above lap surface 23. The control for piston 101 will be described hereinafter.

The diameter of rod 96 is less than the diameter of opening 95 in head 71 by more than the usual manufacturing tolerances so that head 71, when lowered upon lap surface 23 is free to move universally with respect to rod 96 an amount sufficient to enable the head to adjust itself to the lap surface throughout the expected variations in lap contour. Thus, head 71 is permitted to take its position from the lap surface itself instead of from some fixed reference point on the lapping machine frame, and hence sensing head 71 is independent of lap plate wobble.

The controls for the components of the sensing system described above are shown diagrammatically in FIGS. 12a and 12b. These controls may be conveniently arranged physically in groups for ease of operation, servicing or assembly. The groups are shown in FIGS. 12a and 12b bounded by dash lines and comprise the lapping machine standard controls 116, the lap surface sensing control chassis 118, the yoke arm operating controls 119, the solenoid-operated air valve control 120 which performs certain auxiliary functions, and the sensing head 122.

The lapping machine standard controls 116 include a timer switch 117 which is manually operated to initiate the rotation of the lap. The switch has a timing mechanism incorporated therein which may be set to stop the rotation of the machine after the lapse of a predetermined time. The standard controls also include a relay 149 which operates the main switch 148 for turning the lapping machine motor 146 on and off.

The lap surface sensing control chassis 118 may be conveniently located at the control panel of the lapping machine, but it may be readily located at a point removed from the machine if the machine has been automated so that a number of such machines are supervised by one operator from one location. This chassis includes the master manual selector switch 121, a step-down transformer 124, a motor-driven sequence timer 125, three latching relays 126, 127 and 128, and two motor controlling relays 204 and 205.

The yoke arm operating controls 119 are mounted under the motor 69, the latter actually being, in the form selected to illustrate this invention, two motors 129 and 130, one being designed to rotate in one direction only, and the other being designed to rotate only in the opposite direction. Both motors 129 and 130 are connected to the same shaft 68 and serve to rotate said shaft in one or the other of opposite directions at substantially the same speed. The motor controls include individual limit switches 131, 132 for the motors which automatically stop the rotation of the motors upon a predetermined angular movement of the common shaft 68, and a special electrical control 190 which shall be termed for convenience a "feed-back switch" and which determines the degree of rotation of shaft 68 upon successive sensing cycles.

The sensing head may take various forms, two alternative designs 122 and 123 being shown for illustrative purposes. Sensing head 122 has already been described with reference to FIG. 6. Sensing head 123 operates upon the principle that a vertically movable lap-surface contacting probe will turn a blocking cam away from a spring-pressed switch contact to enable the latter to complete a control circuit for operating one of the motors 129 and 130. The details of sensing head 123 will be described hereinafter.

The air valve solenoid 120 controls the admission of air under pressure to the cylinder 108 to lower the sensing head relative to the lap surface. It also admits air to another cylinder cooperating with the "feedback" switch 133, the purpose of which will be detailed hereinafter.

The detailed description of the controls shown in FIGS. 12a and 12b is as follows:

Power for the controls may be the usual 110 volt A.C. line shown at 134 which is connected to terminals 135 and 136 of the timer switch 117 for the lapping machine. Contact 134 is connected to the switch arm 137 of a single pole, double throw switch operated by the manual control for the timer (not shown), said switch having an upper contact 138 and a lower contact 139 connected respectively to terminals 140 and 141 on the said timer 117. Timer motor 142 is connected to terminals 136 and 141. Switch arm 137 is normally connected to upper contact 138 when the timer is not operating, this connection being automatically made when the timer completes its cycle. When the timer is manually operated to start the lapping machine, switch arm 137 is moved manually to its lower contact 139 thereby connecting motor 142 across line 134 to cause it to operate.

The controls are powered in part by 110 v. A.C. and in part by 6 v. A.C., the latter being derived from step-down transformer 124, the primary 143 of which has one side connected to the "auto" terminal of selector switch 121 and its other side connected by a line 144 to ground. The switch arm of selector switch 121 is connected by a line 145 to terminal 140 which is connected, as previously stated, to upper contact 138.

It may be apparent that when timer motor 142 is operating, no 110 v. A.C. is available to primary 143 and hence those controls powered by transformer 124 cannot operate while timer motor 142 is in operation.

The motor 146 for driving the lap plate 21 may be powered from a three-phase line 147 which is connected to motor 146 through a switch 148 operated by a relay 149. One terminal 150 of relay 149 is connected to ground and the other terminal 151 is connected to the terminal 141 on the timer switch 117 through latching relay 126. Said latching relay, 126 has a four-pole, double-throw switch, the arms 152, 153, 154 and 155 of which are mechanically linked together and to the armature of relay coil 156. When relay 126 is de-energized and unlatched, the arms assume the position shown in FIG. 12b in which arm 152 completes the circuit from line 157 connected to terminal 151 of relay 149 to line 158 connected to terminal 141 of timer switch 117. Thus lapping machine motor 146 is energized when timer motor 142 is energized and relay 126 is de-energized and unlatched.

Sequence timer 125 has a motor 159, one terminal 160 of which is permanently connected to ground and the other terminal 161 of which is connected to a switch arm 162 which is one of a series of switch arms 162, 163, 164 and 165 operated by a plurality of cams 166, 167, 168 and 169 driven from a common shaft shown by dot-dash line 170 and driven by motor 159. Each cam has a single rise and dwell, the length and angular disposition of which are predetermined to cause certain circuits to be made and interrupted in a desired sequence. Cam 166 controls the circuit through motor 159. Cam 167 controls the energization and consequent latching of relay 126 and the application of 6 v. A.C. power to sensing head 122. Cam 168 controls a signal light 171 and the application of power to the latching coil 172 of relay 126 to restore said relay to its released condition. Cam 169 applies 110 v. A.C. power to sensing head 122 and to motors 129 and 130, the latter as dictated by intervening relays 127, 128, 129 and 130.

Switch arm 162 of cam 166 can be connected to a lower contact 173 which is connected by a line 175 to the "auto" contact of master selector switch 121 and ultimately to the 110 v. A.C. power source. It can be connected alternatively to an upper contact 174 which is connected to a line 176 and terminal 141. It is intended that motor 159, when de-energized, will come to rest with the cams in the position shown so that power for said motor will normally come through line 175 and selector switch 121. It will, however, become de-energized by cam 166 before making a complete revolution, and it will then be connected through upper contact 174 and line 176 to power through timer switch 117 when the latter is operated. Thus, for the duration of the rise on cam 166, sequence timer motor 159 will be operated when the lapping machine timer 117 is operated, and when the arm 162 is dropped back to its lower contact 170, said motor will be reset to operate when selector switch 121 and timer switch arm 137 complete the circuit to line 134.

Switch arm 163 of cam 167 can be connected to a lower contact 177 and thence through a line 178 to one side of relay 156, the other side of which is connected to ground, so that when cam 167 is off its rise, relay 156 is energized. It will remain energized by a latch shown schematically at 180, regardless of the subsequent de-energization of relay 156 until latch 180 is released by latching coil 172. Switch arm 163 can be connected alternatively to upper contact 181 by the rise of said cam 167 and thence through line 182 supplies 6 v. power to the sensing head 122. A branch line 187 from line 182 connects said 6 v. source of power through relays 204 and 205 to contacts 188, 189 in the "feed-back" control 190 operated by shaft 59 driven by motors 129 and 130. The function of control 190 is to energize the latching coil 172 of relay 126 to release the latched armature of relay coil 156 and thus to deenergize and stop motors 129 and 130.

Switch arm 164 of cam 168 can be connected to a lower contact 191 which connects the 6 v. power source to signal light 171. Said arm 164 can be connected to an upper contact 192 which then applies 6 v. power through a line 193 and switch arm 153 of relay 126 to the latching coil 172 thereof to release the latch 180 and thereby to release said relay 126. The release of this relay prevents operation of the control circuit and makes possible the operation of the starter relay 149 for the lapping machine motor 140.

Switch arm 165 of cam 169 can be connected to a lower contact 193 which supplies 110 v. power through a line 194 and switch arm 155 of relay 126 and line 195 through a rectifier 195a to the arm 84 of sensing head 122. Through a branch line 201 from line 195, the 110 v. power is connected to switch arm 202 of relay 127 and to switch arm 203 of relay 128. The arms 202 and 203 are adapted to apply the 110 v. power to lines which are connected through relays 204 and 205 respectively to motors 130 and 129.

The surface 23 of lap plate 21 may deviate from the desired contour by various amounts. It is desirable of course that the deviation be corrected in the shortest possible time. The time required to effect a correction is a function of the displacement of a wear ring from the position at which it is found when a measurement is made. Since measurements of lap surface contour cannot be made except when the lap plate is stationary, and since it is not desirable to interrupt a lapping operation in progress, such measurements are therefore made between lapping cycles. It is entirely possible that after the wear rings have been displaced radially to make a correction, measurement of the lap surface will indicate that the surface has been brought to the desired contour, but continued operation with the wear rings in the same location will cause the lap surface to become oppositely contoured.

To satisfactorily meet the foregoing conditions, it becomes necessary to take into consideration the condition of the lap surface at the next preceding measurement and to correlate that condition with a present condition before effecting a corrective movement of a wear ring.

Thus, the control for the wear rings 25, 26 and 27 is designed to move the rings radially either inwardly or outwardly by increments of ¼ inch. This movement, however, is modified so that if the yokes 28, 29 and 30 are moved in one direction an increment of ¼ inch and the sensing head upon the next measurement indicates that the desired contour has been effected, then instead of remaining in such position, the yokes will be moved back toward their previous position one-half of the previous movement, i.e., ⅛″ since to remain in the same position would cause an over-correction. If upon the next measurement it is again found that the lap surface has the desired contour, then there will be no movement of the yokes either radially in or out.

Figure 4:
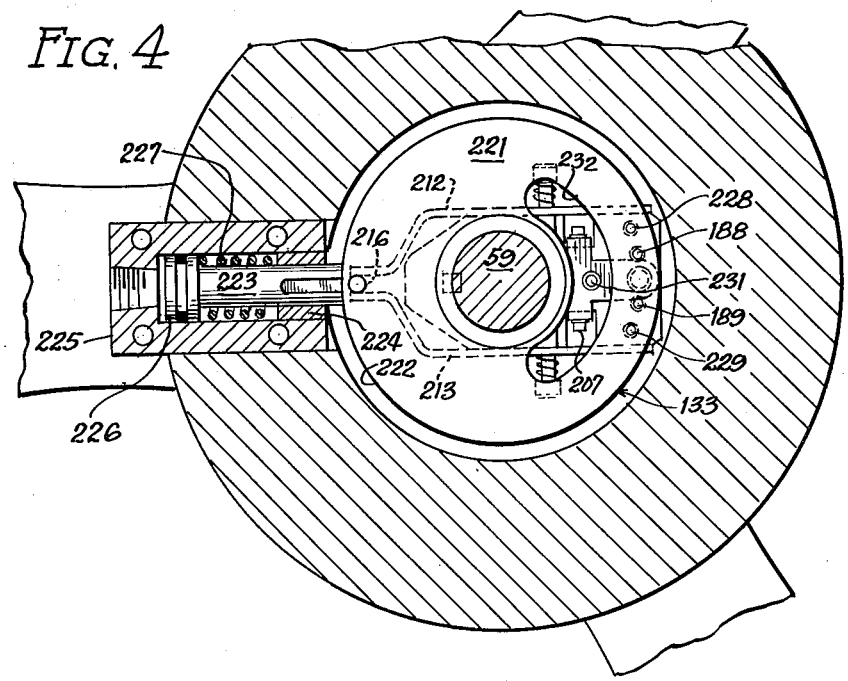
FIG. 4 is a plan view in section of a portion of the control for the adjusting mechanism, the view being taken along line 4—4 of FIG. 3.
Figure 5:
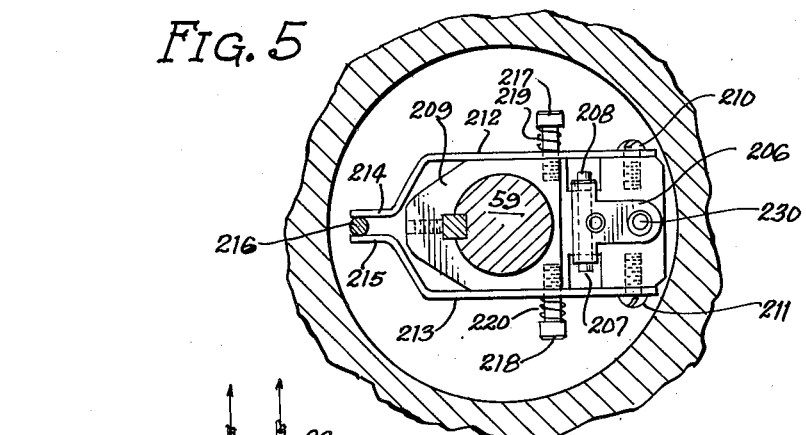
FIG. 5 is a plan view in section of a lower portion of the control for the adjusting mechanism, the view being taken along line 5—5 of FIG. 3.

The controls thus are provided with a "memory" and it is the function of the feed-back switch means 133, together with relays 127 and 128 to supply this memory. The manner in which this is accomplished is as follows:

Referring first to FIGS. 3, 4 and 5, the feed-back switch means 133 is comprised of a switch arm 206 in the form of a brass T-shaped stamping which is mounted on horizontal pivots 207, 208 extending outwardly from the sides of a hub 209 keyed to shaft 59 so as to be compelled to rotate therewith. Hub 209 is made of hard non-conducting material such as Bakelite, hard rubber, micarta or the like, and has secured to its sides by means of screws 210, 211 a pair of spring fingers 212, 213 which pass around opposite sides of shaft 59 and then converge to form parallel-sided jaws 214, 215 within which is retained an axially disposed pin 216. The clamping pressure exerted by said jaws 214, 215 may be increased by adjusting screws 217, 218 threaded through coil springs 219, 220 into the sides of hub 209 through suitable openings (not shown) in fingers 212 and 213.

Pin 216 is secured to, and extends downwardly from, a disc 221 which is freely rotatable on shaft 59 and has a cylindrical outer surface 222 adapted to be frictionally engaged by the end of a radially disposed pin 223. Said pin 223 passes through a guide 224 secured to a small air cylinder 225 within which is a piston 226 to which pin 223 is fastened, or of which said pin 223 may comprise a part. Piston 226 and its pin 223 are held away from disc 221 by a spring 227, and are urged toward the disc by air pressure. Pin 223 thus acts as a brake upon disc 221, while the spring fingers 212, 213, acting upon pin 216 tend to rotate disc 221 with hub 209, and will do so when the brake is not operative. Thus spring fingers 212, 213 act as centering springs for pin 216 and disc 221 with respect to hub 209.

Disc 221 is similarly made of hard non-conductive material and serves to support contacts 188, 189 and two additional contacts 228, 229, all symmetrically and arcuately disposed with reference to the contact 230 on switch arm 206 so as to be engageable thereby as relative rotation occurs between hub 209 and disc 221. Electrical connection is established with switch arm 205 through a line 231 which passes through an arcuate slot 232 in disc 221 and is electrically connected to switch arm 206.

It is contemplated that sensing head 71 will be lowered upon lap surface 23 by piston 101 at the same time that piston 226 is rendered operative to push pin 223 against disc 221 to hold the latter against rotation with shaft 59, and hence both cylinders 108 and 225 are connected to a common pipe 233 which may be connected alternatively to an air pump 234 or to vent pipe 235 through the three-way solenoid operated valve 120.

The description of the probe 77 and its connections may be completed by reference to FIG. 12a, wherein it may be observed that contact 86 thereof is connected to one side of a grounded relay 236 which operates a single pole single throw switch 237 to connect the 6 v. line 182 to a line 238 connected to contact 229 on feed-back switch control 190. Contact 87 is connected to one side of a grounded relay 239 which operates a single pole single throw switch 240 to connect the 6 v. line 182 to a line 241 connected to contact 228 on feed-back switch 190.

Considering now the manner in which the feed-back switch control 190 and the associated relays function to provide the aforesaid "memory" for the system, let it be assumed that the lapping machine has finished the lapping cycle set up for it by the timer 117, and sequence timer motor 159 is now energized from the lapping machine timer 117 through line 176, upper contact 174 and switch arm 162. Continued operation of sequence timer motor 159 will cause switch arm 162 to transfer to the lower contact 170 which is connected directly to the 110 v. line, and the sequence timer will thus continue to function until the cam rise breaks contact with lower contact 170. Simultaneously with the application of 110 v. power from line 175 to sequence timer motor 159, cam 168 will cause its switch arm 164 to apply 6 v. power to indicator light 171 to show that the sensing operation is functioning.

After a few degrees of rotation of the sequence timer motor 159, cam 167 will cause its switch arm 163 to apply 6 v. power through line 178 to relay coil 156 of the principal latching relay 126 to operate said relay. The said relay 126 will latch itself in operative condition so that 110 v. power is immediately applied through switch arm 154 to, and maintained in, solenoid-operated valve 120, thereby to actuate piston 101 to lower sensing head 71 upon lap surface 23 and to actuate piston 226 to hold disc 221 of the feed-back switch 190 against rotation. Head 71 may require a second or two after it is lowered to settle upon lap surface 23 and hence it would be inadvisable to energize said head and start a corrective movement of the yoke arms during this settling period. Accordingly cam 169 is designed to interpose a five-second delay in energizing sensing head 122 and in making power available for the operation of yoke arm motors 129 and 130.

With head 122 energized and resting upon lap surface 23, the position of the hardened point of insert 78 of probe 77 relative to the plane defined by the three points 74, 75 and 76 will determine whether one of the motors 129 and 130 will be operated. Thus if the lap surface is convex instead of flat, the probe 76 will be raised slightly above its neutral or flat position and the long arm 84 will be made to touch contact 86. This will have the following results:

(1) It will connect contact 229 of the feed-back switch 190 to the 6 v. line.

(2) A relay coil 242 in relay 204 will be energized to operate said relay 204.

(3) A relay coil 243 in relay 127 will be energized to operate said relay, and since the latter is of the latching type, it will latch itself in operative condition.

(4) It will apply 6 v. power to a contact 244 of relay 128.

If the sensing operation just described is the first in which arm 84 touches contact 86, then the feed-back switch will perform no function.

The operation of relay 204 causes a switch arm 245 to apply 110 v. power from switch arm 154 of the then operated relay 126 to a line 246 connected to motor 129, which then functions through the aforementioned planetary gearing and arms 49, 50 and 51 to turn the yoke arms 28, 29 and 30 radially inward. While the shaft 59 is rotating, hub 209 of the feed-back switch 190 and the switch arm 206 are also rotating and will continue to do so until arm 206 touches contact 229, whereupon the 6 v. power connected thereto will be conducted through the arm and a line 247 to energize the latch releasing coil 172 of relay 126 and thereby restore said relay to inoperative condition. This deenergizes air valve solenoid 120, and spring 110 raises head 71 above lap surface 23. Spring 227 simultaneously withdraws pin 223 from surface 222 and allows springs 212 and 213 to turn disc 221 until switch arm 206 is again centrally located relative to contacts 188 and 189.

The movement of the rings radially inward will be the maximum available, i.e., ¼″ in the aforesaid example, and by allowing the switch arm 206 to be reset relative to the disc 221 after each operation, the same increment of correction in either direction (radially in or out) will be allowed and it will be independent of the position of the rings 25, 26 and 27 on the lap surface 23.

The latching of relay 127 in operative position establishes a circuit from line 201, through switch 202 and a contact 248 to a line 249 and thence through a switch 250 on released relay 204, its contact 251, and a line 252 to a line 253 connected to motor 130. Said motor 130 is adapted to rotate shaft 59 in a direction opposite to that in which it was rotated in response to the sensing cycle just completed. Line 201 will be connected to the 110 v. power line through switch arm 155 of relay 126 and switch arm 165 operated by sequence timer cam 169 upon the next operation of the sequence timer provided, however, that the probe 76 of sensing head 123 indicates a flat lap surface at that time.

Assuming that upon the next sensing operation a flat lap surface is found so that switch arm 84 of sensing head 123 does not touch either contact 86 or 87, the foregoing circuit to motor 130 is established and shaft 59, with arm 206, will be rotated until said arm 206 touches contact 188. This occurs at approximately ⅛″ radial movement of the wear rings. This will apply the 6 v. power through a switch arm 163 of cam 167 on sequence timer 125 to the latch releasing coil 172 of latching relay 126. The release of relay 126 disconnects the 110 v. power line from motor 130 which had been connected thereto through switch arm 154, and motor 130 thus stops. The latch releasing coil 255 of relay 127 is energized with latch releasing coil 172 of relay 126 through a line 256, switch arm 257 on released relay 204 and line 258 to arm 206 of the feed-back switch 190 and hence the entire circuit is reset to a neutral condition.

Assuming alternatively that the next sensing operation still indicates a convex lap, then relay 204 will again be operated because of the completion of the energizing circuit through sensing head 122 (arm 84 touching contact 86) and motor 129 will rotate shaft 59 and feed-back switch arm 206 until the latter touches contact 229 and thus energizes the latch-releasing coil 172 of relay 126 to release the latter. This again stops motor 129 as previously explained.

Assuming again that the next sensing operation still indicates a convex lap, the operation just described will commence, but this time, if the last movement of the rings brought them to their innermost position on the lap, limit switch 131 associated with motor 129 will stop motor 129, and relay 126 will then be released by sequence timer switch arm 164 and its cam 168 which apply 6 v. power to latch releasing coil 172. If, however, the rings have not yet reached their innermost position, the operation just described will be repeated.

The preceding description has been directed toward the operation of the controls when the sensing head 123 indicates a convex lap and probe 76 is elevated above its neutral position to cause contact 86 to be touched by switch arm 84. When, however, the lap surface 23 is concave, probe 76 will be lowered relative to its neutral position and arm 84 will touch contact 87. The functions described above relative to a convex lap surface will again take place but the movement of the rings 25, 26, 27 will be in the opposite direction.

Assuming that all of the relays have been released and that sensing head 71 has been lowered upon lap surface 23 which is now in a concave condition instead of the desired flat condition, the circuit through arm 84 and contact 87 will energize relay 239 to close switch 240, which then applies 6 v. power to contact 228 of the feed-back switch 190 and also through a line 259 to the coil 260 of relay 205 to energize the latter. The energization of relay 205 breaks the circuit through arm 254 and completes the circuit through a switch arm 261 which applies 110 v. power from a 110 v. line 262, switch arm 156 of previously energized relay 126 (through sequence timer 125) and a line 263 to line 253 connected to motor 130 through limit switch 132. Said motor 130 rotates in the opposite direction from motor 129 and results in moving rings 25, 26 and 27 radially outwardly.

Switch arm 206 of the feed-back switch 190 will move with shaft 59 until it touches contact 228. At this point the 6 v. power passes through switch arm 206 as before to energize latch releasing coil 172 and release relay 126. The 110 v. power is now disconnected from motor 130 and the latter stops. Simultaneously with the energization of relay 205, the 6 v. power from line 259 is applied to the coil 264 of relay 128 to energize the latter. This will cause switch arm 203 to touch contact 265 and apply 110 v. power from line 201 to switch arm 266 which, because of the operated condition of relay 205 at this time, does not touch contact 267 connected to a line 268 running to motor 129. The circuit for operating motor 129 however is "set" so that if the next sensing operation indicates a flat lap surface, the rings 25, 26 and 27 will be brought back inwardly ⅛″.

If upon such next sensing operation the lap surface is flat and neither contact 86 nor 87 is touched by arm 84, the operation of the sequence timer 125 will again energize relay 126, and 110 v. power will be applied through switch arm 155 thereof, line 201, switch arm 203 and contact 265 of relay 128, a line 270, switch arm 266 and contact 267 leading to motor 129. The said motor 129 will then operate and move the rings inward, switch arm 206 of the feed-back switch moving with shaft 59 of motor 129 until it touches contact 189. This applies 6 v. power to the latch releasing coil 172 of relay 126 to release said relay and thereby cut off the 110 v. power from motor 129 to stop said motor. Simultaneously, through line 258, a line 271, a switch arm 272 on relay 205, and lines 273 and 274, latch releasing coil 275 will be energized to release relay 128, thus resetting the circuit for a new cycle of operation.

Thus there are provided in the above described circuitry a primary control system which normally moves the rings 25, 26 and 27 radially inwardly or outwardly by equal basic increments, and a secondary control system which prevents over-correction by moving said rings back one-half an increment after the lap surface has been corrected by a previous incremental movement. The secondary control system makes it unnecessary to wait for a minimum detectable error to occur before a reversal of correction is applied. In a sense, the secondary control system prevents hunting of the correcting device.

The size of the incremental movement of the rings during a primary correction is arbitrary and can be varied by changing the circumferential location of the feed-back control contacts 229 and 228 relative to the neutral position of arm 206.

It may sometimes be desirable to move rings 25, 26 and 27 radially manually as, for example, when there is a malfunction of a component of the automatic control system so that it cannot be relied upon to make a necessary correction. To this end, master selector switch 121 is turned to the manual position and thus applies 110 v. power from lines 145 to a line 276 leading to a single pole, double throw switch 277, one side 278 of which connects line 276 to line 268 leading to motor 129, and the other side 279 of which connects line 276 to line 253 leading to motor 130. Thus by first turning master switch 121 to its "neutral" position, and then appropriately operating manual switch 277, either motor 129 or 130 can be made to operate.

In FIGS. 7 to 11 there is shown in detail the alternative form of sensing head 123. It is comprised of an elongated casting or machined rigid body 280 having three fixed legs 281, 282 and 283 (FIGS. 9 and 10), each provided with a hard, lap surface contacting tip 284, 285, 286, respectively. Casting 280 has a centrally located vertically disposed bore 287 into the ends of which are inserted flanged sleeves 288, 289, which are fixed relative to said bore. Said sleeves have aligned openings 290, 291 in which is slidably disposed a probe 292 having a hard, lap-surface contacting tip 293 in the lower end thereof. Said probe 292 has an axially extending slot 294 at its upper end through which passes a pin 295 fixed to sleeve 288 for the purpose of preventing said probe from turning in the openings 290 and 291. It is contemplated that probe 292 will have a close sliding fit with openings 290 and 291 so that vertical movement of the said probe relative to casting 280 will accurately reflect the contour of the lap surface being tested.

A gear rack 301 is formed in the side of probe 292, said rack cooperating with a pinion gear 302 formed in the end of a pin 303 appropriately secured to a shaft 296. Said shaft 296 is rotatably supported in axially spaced anti-friction bearings 299, 300 mounted in a sleeve 297 fixed in a horizontally disposed bore 298 in rigid body 280. An axially extending bore 304 is formed in the opposite end of shaft 296 to receive a shaft 305 to which is secured a sun gear 306. Suitable bearings 307 and 308 support shaft 305 for rotation relative to shaft 296.

The left hand end of casting 280 as viewed in FIG. 7 is enlarged to form a housing 309 having a rectangular shape in end elevation. Within said housing, and in the upper portion thereof, is fixed a segment 310 of an internal gear which is axially aligned with sun gear 306. A planet gear 311 meshes with sun gear 306 and ring gear segment 310 and is rotatably mounted on a shaft 312 fixed to and extending outwardly from a carrier 313 fixed to shaft 296.

It may be apparent that vertical movement of probe 292 is converted through the intervening shafts and gearing to rotary movement of sun gear 306, and that the movement of sun gear 306 is greatly amplified relative to that of probe 292 through the rack and pinion 307, 302 and planetary gearing 310, 311 and 306.

Secured to sun gear 306, and rotatable therewith, is a blocker cam 314 (FIG. 11) which has a substantially cylindrical surface 315 formed around the lower portion thereof and terminating in horizontally disposed shoulders 316 and 317 symmetrically arranged with respect to the axis of sun gear 306. On either side of cam 314 are disposed bell crank arms 197 to 198 pivotally mounted at 318 and 319 respectively on a block 320 suitably fastened to housing 309. Each arm 197 and 198 terminates in a radially inwardly disposed tooth 321 and 322, respectively, each tooth having a surface 323, 324 which is substantially parallel with shoulders 316 and 317. The lower ends of arms 197 and 198 bear eccentrically against the contacts 325, 326 of microswitches 185 and 186, said contacts being normally urged upwardly by the well-known spring mechanism (not shown) in said microswitches to rotate said arms 197, 198 away from blocker cam 314. Rotation of the arms 197, 198 toward the blocker cam 314 is effected by horizontally extending pins 327, 328 (FIG. 7) secured to a bar 329 pivotally mounted on the armature 330 of solenoid 196. Pins 327 are thus adapted to reciprocate in housing 309 and contact the outwardly flaring ends 331, 332 of spring finger 333, 334 secured to the outer sides of arms 197, 198 to effect the said inward movement thereof. Bar 329 extends into slots 335, 336 formed in the sides of housing 309 by which said bar is guided as it is reciprocated.

Referring to FIG. 11, it may be seen that the surfaces 323 and 324 on teeth 331, 332 of arms 197, 198 are normally disposed slightly below shoulders 316 and 317 on blocker cam 314 so that the teeth ride on surface 315 and are held in a separated condition with respect to one another in which neither microswitch 185, 186 is operated. A slight rotation of blocker cam 314 in a clockwise direction as viewed in FIG. 11 drops shoulder 317 below surface 324 and arm 198 can be moved radially inwardly by solenoid 196 when the latter is energized to pull up armature 330, bar 329 and its pins 327, 328. Tooth 331 on the opposite side will, however, continue to ride on surface 315 and hence there will be no inward movement of arm 197. The radial inward movement of arm 198 effects an operation of microswitch 186. Similar functions are produced in arm 197 when blocker cam 314 is rotated in a counterclockwise direction as viewed in FIG. 11 to operate microswitch 185 to the exclusion of microswitch 186. The sensitivity of the blocker cam mechanism depends upon the angle through which blocker cam 314 must rotate to free a tooth 331 or 332 for radial inward movement, and this sensitivity is further multiplied with respect to movements of probe 292 by the planetary gearing 310, 311, 306.

Rigid body 280 may be supported from piston rod 96 by a carrier 337 secured to the lower end of said rod and made up of built up separable segments to form a transverse slot 338 through which the carrier portion 339 extends. The vertical dimension of slot 338 is greater than the corresponding dimension of portion 339 so that the head may be free of carrier 337 when a lap surface sensing cycle is taking place. A pin 340 extending upward from the bottom of slot 338 and into a recess 341 serves, with a transverse pin 342 passing through portion 339 and slidable in a vertical slot 343 in carrier 337, to hold body 280 steady when the latter is raised from lap surface 23.

The circuit connections which would be made to head 123 are shown in FIG. 12a. Solenoid 196 is grounded on one side and its other side is connected by a line 344 to the 110 v. power line 195. The contacts 183 and 184 of microswitches 185 and 186 are connected to a common line 345 which is connected to the 6 v. power line 182. Switch arm 199 of microswitch 185 is connected by a line 346 to line 238 and switch arm 200 of microswitch 186 is connected by a line 347 to line 259. It may thus be seen that microswitches 185 and 186 perform the functions of switch 237 and 240 of head 122.

It is understood that the foregoing description is merely illustrative of a preferred embodiment of this invention and that the scope thereof therefore should not be limited thereto, but by the appended claims.

I claim:

1. In combination, a machine element having a rotatable working surface adapted to produce a predetermined contour upon an article, rotatable means cooperable with said element surface to shape said surface in accordance with the position of said rotatable means on said working surface, means for shifting the position of said shaping means on said working surface to change the shape of said surface, and control means for the shifting means, said control means comprising a sensing head having supports spaced from one another, and adapted to rest on said surface, a probe carried by said head intermediate said radially spaced supports, said probe being movable relative to said head and adapted to contact said working surface, and means operable as a function of the position of said probe relative to said head for operating said shifting means.

2. The combination described in claim 1, the means operable as a function of the position of said probe comprising a pair of electrical switches, means for mutually exclusively operating said switches, and means connected to the probe for moving the switch operating means.

3. The combination described in claim 1, the means operable as a function of the position of said probe comprising a pair of electrical switches, a pivoted switch operating arm for each switch, movable cam means contacting said switch operating arms and constructed in one position to prevent both arms from operating their respective switches, and in another position to prevent only one arm from operating its respective switch.

4. The combination as described in claim 3, said means driving the cam including motion multiplying means.

5. The combination as described in claim 3, said cam means being rotatable, and said means for driving the cam comprising a shaft, rack and pinion means connecting the shaft and probe for driving the shaft from the probe, and planetary gearing mounted in said head and connecting said shaft to said rotatable cam.

6. The combination described in claim 1, and means for raising and lowering said sensing head relative to said working surface, said last-mentioned means comprising a rigid support, a rod mounted on said support and movable relative to said support toward and away from said working surface, and a connection between the rod and head providing for limited universal movement therebetween, whereby said head can be adjusted so that the said supports rest upon said working surface as aforesaid.

7. The combination described in claim 1, and means for raising and lowering said sensing head relative to said working surface, said last-mentioned means comprising a rigid support, a rod mounted on said support and movable relative to said support toward and away from said working surface, said head having an opening through which the rod loosely extends such that the rod is movable transversely of said opening, and a lost motion connection between the rod and head permitting the head to move axially of said rod whereby to transfer the weight of said head from said rod to said radially spaced supports on said head.

8. In combination, a machine element having a rotatable working surface adapted to produce a predetermined contour upon an article, ring means resting upon said element surface and rotatable thereon, said ring means being adapted to shape said surface in accordance with the location of said ring means on said surface, and means for changing the location of said ring means to change the shape of said surface, said location changing means comprising a framework extending over the working surface, movable means mounted on said framework and oscillatable with respect thereto, a bell crank pivoted on said framework and having one arm thereof extending toward and movable with said movable means and the other arm thereof extending into proximity to the ring means, spaced rollers on said other arm adapted to receive and rotatably hold said ring means between them, and motor means for driving said movable means.

9. In combination, a machine element having a rotatable working surface adapted to produce a predetermined contour upon an article, a plurality of ring means resting upon said element surface and rotatable thereon, said ring means being adapted to shape said surface in accordance with the location of said ring means on said surface, and means for simultaneously changing the location of all of said ring means to change the shape of said surface, said location changing means comprising a rigid framework extending over the working surface, movable means mounted on said framework and oscillatable with respect thereto, a plurality of bell cranks pivoted on said framework and each having one arm thereof extending toward and movable with said movable means and the other arm thereof extending in proximity to individual ones of said ring means, spaced rollers mounted on said other arms and adapted to receive and rotatably hold said ring means between them, and motor means for driving the movable means, whereby to shift said bell cranks simultaneously and thereby shift all of said ring means simultaneously as aforesaid.

10. The combination described in claim 9, said framework comprising a multi-armed spider bar having a hub disposed substantially centrally of the rotatable working surface, and said arms extending radially outwardly from said hub, one arm for each ring means, said movable means and its motor means being disposed over said spider hub.

11. In combination, a machine element having a rotatable working surface adapted to produce a predetermined contour upon an article, motor means for driving said element, rotatable means resting upon said element surface, said rotatable means being adapted to shape said surface in accordance with the location of said rotatable means in said surface, means for changing the location of said shaping means, motor means for driving said location changing means, control means for the location changing means comprising a sensing head adapted to be supported on said working surface on three points, a probe carried by said sensing head and adapted to move relative thereto, means for moving the sensing head toward the working surface to cause the head to be supported thereon on said three points, means urging the probe into contact with said surface, motor means for driving said sensing head moving means, and control means for all of said motor means, said control means including individual control elements for each of said motors, and means for operating said individual control elements in sequence to disable the motor for the machine element, energize the motor for the sensing head to move said head toward the working surface, condition for operation the motor means for driving said shifting means, retract the sensing head, and condition for operation the motor for the machine element.

12. The combination described in claim 11, a timer switch controlling the operation of said motor means for driving said element and for supplying power to the motor means for driving said shifting means, motor means controlled by said timer switch for driving the means for operating said individual control elements in sequence, and manually operable switch means interposed between the timer switch and the said motor means for driving said individual control elements for disabling the last-mentioned motor means and for operating the motor means for driving said shifting means at will.

13. A sensing head for sensing deviations of a point on a surface from a reference point, said head comprising a probe movable toward and away from said surface, means for translating the movement of said probe into a motion of rotation, a cam rotated by said translating means, a pair of pivoted levers having followers normally riding the said cam and disposed on opposite sides of said cam, means resiliently urging said levers away from the cam, said cam having a rise for each follower, said followers being adapted in one angular position of the cam to hold said pair of pivoted levers in an inoperative position and in another angular position to hold one lever in an inoperative position and the other lever in an operative position, and signal producing means operated by said other lever when said other lever is in an operative position whereby to indicate deviations of the location of a point on the surface from a reference point.

14. In combination, a machine element having a rotatable working surface adapted to produce a predetermined contour upon an article, ring means cooperable with said element surface to shape said surface, means operable in increments upon the ring means for changing the shaping effect thereof upon the working surface as between producing convex and concave contours thereon, contour sensing means cooperable with the said surface to sense deviations in contour thereof from said predetermined contour, said sensing means comprising means for generating an impulse of one kind when the sensed contour is more convex than the predetermined contour and an impulse of another kind when the sensed contour is more concave than the predetermined contour, means for translating a said impulse into an increment of variation of the means operable upon the ring means for changing the shaping effect thereof on said surface in accordance with the kind of impulse generated, and means movable with the means operable upon the ring means to preset and condition the impulse translating means for the next impulse.

15. In combination, a rotatable lap having an annular surface of predetermined contour for producing an oppositely contoured surface on an article, a rotatable wear ring resting upon said lap surface and adapted to overhang the inner and outer peripheries of the lap surface, means for shifting said wear ring radially of the lap to change the relative amount of overhang of the ring as between the inner and outer peripheries of the lap surface whereby to change the contour of the lap surface, means for sensing deviations of the lap surface contour from said predetermined contour, means controlled by said sensing means for shifting said ring radially a predetermined increment upon first sensing a deviation from said predetermined contour in a given direction, and means for shifting said ring back a fraction of said predetermined increment upon sensing no deviation from said predetermined contour during the next sensing operation.

16. The combination described in claim 15, and means for preventing shifting of said wear ring upon sensing no deviation from said predetermined contour during the third successive sensing operation.

17. In combination, a rotatable lap having an annular surface of predetermined contour for producing an oppositely contoured surface upon an article, a rotatable wear ring resting upon said lap surface and adapted to overhang the inner and outer peripheries of the lap surface, motor-operated means for shifting said wear ring radially of the lap to change the relative amount of overhang of the ring as between the inner and outer peripheries of the lap surface whereby to change the contour of the lap surface, means for sensing deviations of the lap surface contour from said predetermined contour, a primary control circuit for the motor-operated means dictated to by the sensing head for shifting said ring radially by predetermined increments, and a secondary control circuit for effecting a reverse movement of the motor-operated means, said secondary control circuit including control means movable with a portion of the motor-operated means and said secondary control circuit being dictated to jointly by the sensing head and the control means movable with a portion of the motor-operated means.

18. The combination described in claim 17, said control means movable with a portion of the motor-operated means comprising a switch part movable with the motor-operated means, a contact member adapted to be contacted by said switch part, resilient means on the part movable with the motor-operated means and adapted to move the contact member to a predetermined position relative to the said part movable with the motor-operated means, and means for holding said contact member against movement with the said part movable with the motor-operated means to cause said switch part to traverse said contact member.

19. The combination described in claim 17, said control means movable with a portion of the motor-operated means comprising an oscillatable switch arm movable with a portion of the motor-operated means, a disc having arcuately arranged contacts adapted to be contacted by said switch arm, centering spring means cooperable with the switch arm and disc and adapted to move the disc to a predetermined position relative to the switch arm, and means for holding said disc against movement with the switch arm to cause said arm to traverse the contacts on said disc.

20. The combination described in claim 19, said sensing means comprising a sensing head and a probe carried by said head, said head being adapted to be lowered into contact with the annular surface of the lap, means for lowering said sensing head, and means for simultaneously operating the disc-holding means and the sensing head lowering means.

21. In combination, a machine element having a rotatable working surface adapted to produce a predetermined contour upon an article, rotatable means cooperable with said element surface to shape said surface in accordance with the position of said rotatable means on said working surface, means for shifting the position of said shaping means on said working surface to change the shape of said surfaces, and control means for the shifting means, said control means comprising a sensing head having three supports spaced from one another and adapted to be moved toward said surface to be supported thereon by said three supports, a probe carried by said head intermediate said spaced supports, said probe being movable relative to said head and adapted to contact said working surface, means operable as a function of the position of said probe relative to said head for operating said shifting means, means for energizing the said means operable as a function of the position of said probe, and timer means controlling the energizing means and adapted to delay the operation of the energizing means for a predetermined time interval after the sensing head is moved toward said surface.

References Cited in the file of this patent

UNITED STATES PATENTS

| | | |
|---|---|---|
| 1,582,481 | Law | Apr. 27, 1926 |
| 2,565,590 | Bullard | Aug. 28, 1951 |
| 2,821,818 | McGee et al. | Feb. 4, 1958 |
| 2,851,827 | Hill | Sept. 16, 1958 |
| 2,870,580 | Norton | Jan. 27, 1959 |
| 2,883,802 | Katzke | Apr. 28, 1959 |
| 2,946,162 | Mader et al. | July 26, 1960 |
| 2,994,993 | Jones | Aug. 8, 1961 |
| 3,031,806 | Jones | May 1, 1962 |